United States Patent
Morishita et al.

(10) Patent No.: US 10,844,215 B2
(45) Date of Patent: Nov. 24, 2020

(54) POLYESTER RESIN COMPOSITION

(71) Applicant: MITSUBISHI GAS CHEMICAL COMPANY, INC., Tokyo (JP)

(72) Inventors: Takami Morishita, Kanagawa (JP); Takeshi Hirokane, Tokyo (JP); Kentaro Ishii, Kanagawa (JP); Tomoe Morishita, Tokyo (JP); Hirokatsu Arai, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 16/099,063

(22) PCT Filed: May 9, 2017

(86) PCT No.: PCT/JP2017/017590
§ 371 (c)(1),
(2) Date: Nov. 5, 2018

(87) PCT Pub. No.: WO2017/195791
PCT Pub. Date: Nov. 16, 2017

(65) Prior Publication Data
US 2019/0144662 A1 May 16, 2019

(30) Foreign Application Priority Data

May 10, 2016 (JP) ................. 2016-094789
Jun. 6, 2016 (JP) ................. 2016-112555

(51) Int. Cl.
C08L 67/02 (2006.01)
C08K 3/34 (2006.01)
C08G 63/672 (2006.01)

(52) U.S. Cl.
CPC ............ C08L 67/02 (2013.01); C08G 63/672 (2013.01); C08K 3/34 (2013.01)

(58) Field of Classification Search
CPC .......... C08G 63/672; C08K 3/34; C08L 67/02
See application file for complete search history.

(56) References Cited

U.S. PATENT DOCUMENTS

| 2004/0058805 A1 | 3/2004 | Nakajima et al. |
| 2004/0059084 A1 | 3/2004 | Hirokane et al. |
| 2005/0209435 A1 | 9/2005 | Hirokane et al. |
| 2015/0133626 A1 | 5/2015 | Minezaki et al. |

FOREIGN PATENT DOCUMENTS

| JP | 2002-69165 | | 3/2002 |
| JP | 2004-67973 | A | 3/2004 |
| JP | 2004-137477 | A | 5/2004 |
| JP | 2005-325158 | A | 11/2005 |
| JP | 2006-225621 | A | 8/2006 |
| JP | 2007-204740 | A | 8/2007 |
| JP | 2007-326890 | A | 12/2007 |
| JP | 2015/151544 | A | 8/2015 |
| JP | 2015-168779 | A | 9/2015 |
| TW | 200602429 | * | 1/2006 |
| WO | 2013/168804 | A1 | 11/2013 |

OTHER PUBLICATIONS

Ultramarine Blue—Tech Data Sheet Jan. 2011 (Year: 2011).*
M.Lauzon "Latest additives take on new grades, colors", May 11, 2000 (Year: 2000).*
International Search Report in International Patent Application No. PCT/JP2017/017590, dated Jul. 4, 2017.
International Preliminary Report on Patentability in International Patent Application No. PCT/JP2017/017590, dated Nov. 13, 2018.

* cited by examiner

*Primary Examiner* — Ling Siu Choi
*Assistant Examiner* — Gennadiy Mesh
(74) *Attorney, Agent, or Firm* — Greenblum & Bernstein, P.L.C.

(57) ABSTRACT

A polyester resin composition containing a polyester resin and 1 to 500 ppm of ultramarine based on a total amount of the polyester resin composition, wherein the polyester resin contains dicarboxylic acid structural unit and diol structural unit, the diol structural unit contain structural unit derived from a diol having a cyclic acetal skeleton, and a content of the structural unit derived from a diol having a cyclic acetal skeleton is 1 to 60 mol % based on a total amount of the diol structural unit.

2 Claims, No Drawings

POLYESTER RESIN COMPOSITION

TECHNICAL FIELD

The present invention relates to a polyester resin composition.

BACKGROUND ART

Of aromatic saturated polyester resins, polyethylene terephthalate (hereinafter sometimes referred to as "PET"), in particular, is a resin well balanced among mechanical performance, solvent resistance, aroma retention property, weathering resistance, recycling property, etc., and it has been used in a large amount centering around applications such as bottles and films. However, PET suffers from defects in crystallizability and heat resistance. Specifically, regarding the crystallizability, PET has high crystallizability, and therefore, when an attempt to produce a thick molded product or sheet is made, whitening occurs owing to crystallization to thereby impair transparency. Regarding the heat resistance, a glass transition temperature of PET is about 80° C., and therefore, PET cannot be used in applications requiring high heat resistance and transparency, such as products used in automobiles, packaging materials for import and export, food packaging materials to be subjected to retort treatment or microwave heating, and baby bottles and tableware to be subjected to heat sterilization treatment.

On the other hand, a polyester resin including structural unit derived from a diol having a cyclic acetal skeleton (e.g., patent literature 1) is a polyester resin having been improved in heat resistance of PET or polyethylene naphthalate (hereinafter sometimes referred to as "PEN") while having high transparency, and it is possible to use the resin in applications requiring transparency and heat resistance. This resin is a resin suppressed in crystallizability, and even when a thick molded product or sheet is produced therefrom, a transparent molded product can be readily obtained without disadvantages such as whitening due to crystallization.

CITATION LIST

Patent Literature

Patent literature 1: Japanese Patent Laid-Open No. 2002-69165

SUMMARY OF INVENTION

Technical Problem

On the other hand, in the production of a polyester resin composition and a molded product using the composition, blue coloring materials to suppress yellowing, such as a cobalt compound, are sometimes added, and in that case, the resulting polyester resin holds a good color tone.

In the case of a polyester resin produced by adding a cobalt compound as a blue coloring material and including a structural unit derived from a diol having a cyclic acetal skeleton, the color tone of pellets obtained after production of the resin is good, but by the studies of the present inventors, it has become apparent that when the pellets are used as a raw material and molded at a high temperature or molded after a long residence time at a high temperature, the problem of yellowing of the resulting product occurs.

The present invention has been made in the light of the above problem associated with the prior art, and it is an object of the present invention to provide a polyester resin composition which has non-crystalline property (transparency) and heat resistance, which are properties of a polyester resin including a structural unit derived from a diol having a cyclic acetal skeleton, and is also excellent in yellowing resistance in the form of a resin composition to enable providing a molded product having a better color tone by injection molding or extrusion molding, as well as excellent in heat stability.

Solution to Problem

As a result of earnest studies to solve the above problem, the present inventors have found that the above problem can be solved by incorporating ultramarine into a polyester resin including a structural unit derived from a diol having a cyclic acetal skeleton, and have accomplished the present invention.

That is to say, the present invention is as follows.

[1]

A polyester resin composition comprising a polyester resin and 1 to 500 ppm of ultramarine based on a total amount of the polyester resin composition, wherein the polyester resin comprises a dicarboxylic acid structural unit and a diol structural unit, the diol structural unit comprises a structural unit derived from a diol having a cyclic acetal skeleton, and a content of the structural unit derived from a diol having a cyclic acetal skeleton is 1 to 60 mol % based on a total amount of the diol structural unit.

[2]

The polyester resin composition according to [1], wherein the diol having a cyclic acetal skeleton is a diol represented by the following formula (1) and/or formula (2):

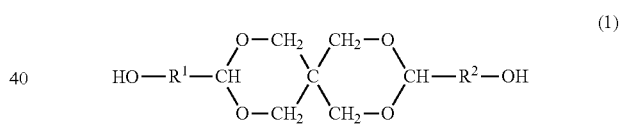

wherein $R^1$ and $R^2$ each independently represent an organic group selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms,

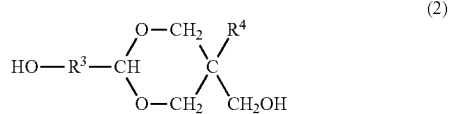

wherein $R^3$ and $R^4$ each independently represent an organic group selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms.

[3]

The polyester resin composition according to [1] or [2], wherein the diol having a cyclic acetal skeleton is 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

Advantageous Effects of Invention

According to the present invention, a polyester resin composition which has non-crystalline property (transparency) and heat resistance, which are properties of a polyester resin comprising a structural unit derived from a diol having a cyclic acetal skeleton, and is also excellent in yellowing resistance in the form of a resin composition to enable providing a molded product having a better color tone by injection molding or extrusion molding, as well as excellent also in heat stability.

DESCRIPTION OF EMBODIMENTS

Embodiments to carry out the present invention (hereinafter simply referred to as "the present embodiment") will be described in detail hereinafter. The present embodiments below are examples to describe the present invention, and it is not intended to limit the present invention to the following contents. The present invention can be carried out with appropriate modification within the scope of its spirit.

[Polyester Resin Composition]

The polyester resin composition of the present embodiment comprises a polyester resin and 1 to 500 ppm of ultramarine based on the total amount of the polyester resin composition; the polyester resin comprises a dicarboxylic acid structural unit and a diol structural unit; the diol structural unit comprise a structural unit derived from a diol having a cyclic acetal skeleton; and a content of the structural unit derived from a diol having a cyclic acetal skeleton is 1 to 60 mol % based on the total amount of the diol structural unit.

[Ultramarine]

By using ultramarine, a molded product whose color tone is maintained more favorably can be obtained even through molding a polyester resin comprising the structural unit derived from a diol having a cyclic acetal skeleton at a high temperature or through molding such a polyester resin after a long residence time in a molding machine, as compared with cases using another color material such as a cobalt compound. Moreover, it is surprising that by using ultramarine, such a resin does not easily gel even when the resin is allowed to stand under the high-temperature conditions for a long period of time to thereby result in excellent heat stability in injection molding, extrusion molding or the like.

Ultramarine is a kind of blue inorganic pigment, and is also called ultramarine Blue, or Pigment Blue 29, as another name. Natural products and synthetic products are both available. The CAS number is 57455-37-5.

A volume median diameter d50 of the ultramarine is preferably 0.1 to 20 μm, more preferably 0.1 to 10 μm, still more preferably 0.1 to 2 μm. When the volume median diameter d50 of the ultramarine is in the above range, yellowing resistance of the polyester resin composition and a color tone of a molded product obtained by injection molding or extrusion molding of the polyester resin composition tend to be further improved. The volume median diameter d50 of the ultramarine can be measured using MASTERSIZERS manufactured by Malvern Instruments Ltd.

A 90% cumulative volume particle diameter d90 of the ultramarine is preferably 0.1 to 12 μm, more preferably 0.1 to 7 μm, still more preferably 0.1 to 3 μm. When the 90% cumulative volume particle diameter d90 of the ultramarine is smaller, yellowing of the polyester resin composition tends to be further suppressed, and ultramarine aggregates in a molded product obtained by injection molding or extrusion molding of the polyester resin composition tend to be smaller.

A difference (d90-d50) between the volume median diameter d50 and the 90% cumulative volume particle diameter d90 of the ultramarine is preferably 0.1 to 12 μm, more preferably 0.5 to 7 μm, still more preferably 0.5 to 3 μm. The difference (d90-d50) can be used as a measure of a volume particle size distribution of the ultramarine used. When the difference (d90-d50) is in the above range, particles having higher uniformity are dispersed in the polyester resin composition. By virtue of this, yellowing of the polyester resin composition tends to be further suppressed, and besides, ultramarine aggregates in a molded product obtained by injection molding or extrusion molding of the polyester resin composition tend to be smaller.

The volume median diameter d50 and the 90% cumulative volume particle diameter of the ultramarine can be adjusted by classifying the ultramarine.

A content of the ultramarine is 1 to 500 ppm, preferably 1 to 250 pp, more preferably 2 to 200 ppm, still more preferably 2 to 150 ppm, particularly preferably 2 to 100 ppm, based on the total amount of the polyester resin composition. When the content of the ultramarine is in the above range, yellowing resistance of the polyester resin composition and a color tone of a molded product obtained by injection molding or extrusion molding of the polyester resin composition tend to be further improved.

[Polyester Resin]

The polyester resin for use in the present embodiment is a polyester resin comprising the dicarboxylic acid structural unit and the diol structural unit, wherein the diol structural unit comprise structural unit derived from a diol having a cyclic acetal skeleton, and a content of the structural unit derived from a diol having a cyclic acetal skeleton is 1 to 60 mol % based on the total amount of the diol structural unit.

[Diol Structural Unit]

The diol structural unit comprise the structural unit derived from a diol having a cyclic acetal skeleton, and may comprise the structural unit derived from other diols, when needed.

(Diol Having Cyclic Acetal Skeleton)

The diol having a cyclic acetal skeleton is preferably, but not particularly limited to, a diol represented by the formula (1) and/or the formula (2), for example. By using such a diol, non-crystalline property (transparency) and heat resistance, which are properties of a polyester resin comprising the structural unit derived from a diol having a cyclic acetal skeleton, tend to be further improved.

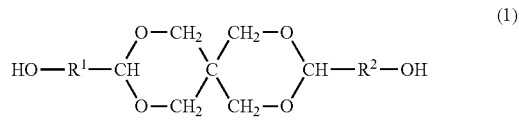
(1)

wherein $R^1$ and $R^2$ each independently represent an organic group selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms.

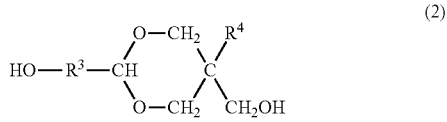

(2)

wherein $R^3$ and $R^4$ each independently represent an organic group selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms.

Examples of the diol represented by the formula (1) and/or the formula (2) include, but not particularly limited to, 3,9-bis(1,1-dimethyl-2-hydroxyethyl)-2,4,8,10-tetraoxaspiro[5.5]undecane (hereinafter also referred to as "spiro glycol") and 5-methylol-5-ethyl-2-(1,1-dimethyl-2-hydroxyethyl)-1,3-dioxane (hereinafter also referred to as "dioxane glycol"). When the structural unit derived from such a diol having a cyclic acetal skeleton are included, non-crystalline property (transparency) and heat resistance tend to be further improved. The diols having a cyclic acetal skeleton may be used singly, or may be used in combination of two or more thereof.

The content of the structural unit derived from a diol having a cyclic acetal skeleton is 1 to 60 mol %, preferably 3 to 58 mol %, more preferably 5 to 55 mol %, still more preferably 10 to 50 mol %, based on the total amount of the diol structural unit. When the content of the structural unit derived from a diol having a cyclic acetal skeleton is in the above range, crystallizability of the polyester resin lowers and the glass transition temperature increases, and therefore, non-crystalline property (transparency) and heat resistance tend to be further improved.

(Other Diols)

The diols other than the diol having a cyclic acetal skeleton are not particularly limited, and examples thereof include aliphatic diols, such as ethylene glycol, trimethylene glycol, 1,4-butanediol, 1,5-pentanediol, 1,6-hexanediol, diethylene glycol, propylene glycol and neopentyl glycol; polyether diols, such as polyethylene glycol, polypropylene glycol and polybutylene glycol; alicyclic diols, such as 1,3-cyclohexanedimethanol, 1,4-cyclohexanedimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol and pentacyclododecane dimethanol; bisphenols, such as 4,4'-(1-methylethylidene)bisphenol, methylenebisphenol (another name: bisphenol F), 4,4'-cyclohexylidenebisphenol (another name: bisphenol Z) and 4,4'-sulfonylbisphenol (another name: bisphenol S); alkylene oxide adducts of the above bisphenols; aromatic dihydroxy compounds, such as hydroquinone, resorcin, 4,4'-dihydroxybiphenyl, 4,4'-dihydroxydiphenyl ether and 4,4'-dihydroxydiphenyl benzophenone; and alkylene oxide adducts of the above aromatic dihydroxy compounds.

Of these, ethylene glycol, diethylene glycol, trimethylene glycol, 1,4-butanediol and 1,4-cyclohexanedimethanol are preferable, and ethylene glycol is particularly preferable, in view of mechanical performance of the polyester resin, economy, etc. Other diols may be used singly, or may be used in combination of two or more thereof.

The content of the structural unit derived from other diols is 40 to 99 mol %, preferably 42 to 97 mol %, more preferably 45 to 95 mol %, still more preferably 50 to 90 mol %, based on the total amount of the diol structural unit. When the content of the structural unit derived from other diols is in the above range, non-crystalline property (transparency) and heat resistance tend to be further improved.

[Dicarboxylic Acid Structural Unit]

The dicarboxylic acid structural unit are not particularly limited, and examples thereof include dicarboxylic acid unit derived from aliphatic dicarboxylic acids, such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbornanedicarboxylic acid, tricyclodecanedicarboxylic acid and pentacyclododecanedicarboxylic acid; and aromatic dicarboxylic acids, such as terephthalic acid, isophthalic acid, phthalic acid, 2-methylterephthalic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid and tetralindicarboxylic acid.

Of these, aromatic dicarboxylic acids, such as terephthalic acid, isophthalic acid, 1,4-naphthalenedicarboxylic acid, 1,5-naphthalenedicarboxylic acid, 2,6-naphthalenedicarboxylic acid and 2,7-naphthalenedicarboxylic acid, are preferable, and terephthalic acid, 2,6-naphthalenedicarboxylic acid and isophthalic acid are particularly preferable, in view of mechanical performance and heat resistance of the polyester resin. Of these, terephthalic acid is most preferable from the economical viewpoint. The dicarboxylic acids may be used singly, or may be used in combination of two or more thereof.

[Process for Producing Polyester Resin]

A process for producing the polyester resin is not particularly limited, and hitherto known processes can be applied. Examples of such processes include a melt polymerization process, such as transesterification process or direct esterification process, and a solution polymerization process.

In each of the above processes, any of known catalysts can be used. Examples of the known catalysts include, but not particularly limited to, alkoxides of metal magnesium, sodium and magnesium; and fatty acid salts, carbonates, hydroxides, chlorides and oxides of zinc, lead, cerium, cadmium, manganese, lithium, sodium, potassium, calcium, nickel, magnesium, vanadium, aluminum, tin, germanium, antimony and titanium. Of these, compounds of manganese, titanium, antimony and germanium are preferable, and manganese acetate, titanium tetrabutoxide, antimony trioxide and germanium dioxide are particularly preferable. These catalysts may be used singly, or may be used in combination of two or more thereof.

In each of the above processes, any of known additives may be used, when needed. Examples of the known additives include, but not particularly limited to, etherification inhibitors, various stabilizers such as heat stabilizers and light stabilizers, polymerization modifiers, antistatic agents, lubricants, antioxidants, mold release agents, and basic compounds.

Examples of the etherification inhibitors include, but not particularly limited to, amine compounds.

Examples of the heat stabilizers include, but not particularly limited to, phosphorus compounds. Of these, phosphoric esters are preferable, and triethyl phosphate is more preferable.

Examples of the basic compounds include, but not particularly limited to, carbonates, hydroxides, carboxylates, oxides, chlorides and alkoxides of alkaline metals such as lithium, sodium and potassium. Of these, potassium acetate, sodium acetate and lithium acetate are particularly preferable.

As for the process for producing the polyester resin, the transesterification process include, for example, but not particularly limited to, a transesterification step of heating a raw material diol that becomes diol structural unit, a dicarboxylic ester that becomes dicarboxylic acid structural unit, and a catalyst up to a predetermined temperature to thereby promote a transesterification reaction, and a polycondensation step of adding a catalyst and a heat stabilizer to the resulting solution and further heating the resultant under a reduced pressure to thereby promote a polycondensation reaction. The direct polymerization process include, for example, an esterification reaction step of heating a raw material diol that becomes diol structural unit, a dicarboxylic acid that becomes dicarboxylic acid structural unit, and a catalyst up to a predetermined temperature to thereby promote an esterification reaction, and a polycondensation step of adding a catalyst and a heat stabilizer to the resulting solution and further heating the resultant under a reduced pressure to thereby promote a polycondensation reaction. The raw materials may be fed all together before the beginning of the reaction, or a part of them may be fed in the course of the reaction.

[Process for Producing Polyester Resin Composition]

A process for producing the polyester resin composition of the present embodiment is not particularly restricted as long as it is a process including a step of obtaining a polyester resin composition that is in a state where the polyester and 1 to 500 ppm of ultramarine based on the total amount of the polyester resin composition are mixed.

For example, it is preferable to add ultramarine together with the raw materials, etc. or separately from the raw materials in at least one stage in the production steps for the polyester (e.g., the transesterification step, the polycondensation step). It is more preferable to add ultramarine in an arbitrary stage before the polycondensation reaction is completed, among the above stages. It is still more preferable to add ultramarine particularly after the esterification reaction or the transesterification reaction is completed and subject it to the polycondensation reaction. It is also possible to knead ultramarine into the polyester resin when the resin is in a molten state.

The polyester resin composition of the present embodiment may be prepared by previously preparing a polyester in which ultramarine is contained in a higher concentration than that in the polyester resin composition to be finally obtained (hereinafter referred to as a "masterbatch") and mixing the masterbatch and a polyester containing no ultramarine in various ratios. The masterbatch is obtained by, for example, melt kneading the polyester resin and ultramarine in a single screw or twin-screw extruder. By carrying out this melt kneading plural times, masterbatches gradually decreased in the concentration of ultramarine can also be obtained. The masterbatch can be obtained also by, for example, adding ultramarine together with the raw materials, etc. or separately from the raw materials in at least one stage of the production steps for the polyester resin (e.g., the transesterification step, the polycondensation step).

[Color Tones (a Value, b Value, YI) of Pellets]

Color tones (a value, b value, YI) of pellets of the polyester resin composition of the present embodiment can be measured in accordance with JIS-Z-8722. The a value of the pellets of the polyester resin composition as measured in such a manner is preferably +8.0 to −8.0, more preferably +5.0 to −5.0, still more preferably +3.0 to −3.0. The b value is preferably +4.0 to −10.0, more preferably +3.0 to −8.0, still more preferably +2.5 to −5.0. The YI is preferably +12.0 to −30.0, more preferably +10.0 to −24.0, still more preferably +7.0 to −15.0. In the measurement of the color tones (a value, b value, YI) of the pellets, a color difference meter (model: ZE2000) manufactured by Nippon Denshoku Industries Co., Ltd. can be used. As a more detailed method for measuring color tones (a value, b value, YI) of the pellets, the method described in Examples can be used.

[Gelation Ratio]

A gelation ratio of the polyester resin composition of the present embodiment can be calculated in the following manner. Dried polyester resin composition pellets are placed in a SUS container, and the container is purged with nitrogen and then hermetically closed. Thereafter, the pellets of the polyester resin composition in the SUS container are heated at 270° C. or 290° C. for a predetermined time and then dissolved in chloroform, followed by suction filtration to obtain insolubles. The insolubles obtained on the filter are dried to a constant weight, and a weight ratio thereof to the initial amount of the pellets (weight of pellets of the polyester resin composition given when the pellets are enclosed in the SUS container) can be calculated as a gelation ratio.

The gelation ratio measured as above under the conditions of a heating temperature of 290° C. and a heating time of 30 hours is preferably not more than 10%, more preferably not more than 5%, still more preferably not more than 3%. The gelation ratio measured under the conditions of a heating temperature of 270° C. and a heating time of 60 hours is preferably not more than 10%, more preferably not more than 5%, still more preferably not more than 3%.

[Method for Molding Polyester Resin Composition]

A method for molding the polyester resin composition of the present embodiment is not particularly limited, and any of hitherto known methods, such as injection molding, extrusion molding, calendering, extrusion foam molding, extrusion blow molding and injection blow molding, can be used.

[Color Tone (YI) of Molded Product]

A color tone (YI) of a molded product of the polyester resin composition of the present embodiment is preferably +5.0 to −10.0, more preferably +4.0 to −7.0, still more preferably +3.0 to −4.0. In the measurement of the color tone (YI) of the molded product, a color difference/haze measuring instrument manufactured by Nippon Denshoku Industries Co., Ltd. (model: COH-400, the same also applies in the measurement of yellowing indexes 1 to 3) can be used. As a more detailed method for measuring a color tone (YI) of the molded product, the method described in Examples can be used.

[Yellowing Index 1 (ΔYI) in Injection Molding]

A difference between a color tone of an injection molded piece prepared using the polyester resin composition of the present embodiment under the conditions of a cylinder temperature of 265° C. in the injection molding and a residence time of 2 minutes in a cylinder in the injection molding (YI1) and a color tone of an injection molded piece prepared under the conditions of a cylinder temperature of 265° C. in the injection molding and a residence time of 5 minutes in a cylinder in the injection molding (YI2) is defined as a yellowing index 1 (ΔYI). In this case, the yellowing index 1 (ΔYI) is preferably not more than +0.25, more preferably not more than +0.23, still more preferably not more than +0.20.

[Yellowing Index 2 (ΔYI) in Injection Molding]

A difference between a color tone of an injection molded piece prepared using the polyester resin composition of the present embodiment under the conditions of a cylinder temperature of 265° C. in the injection molding and a residence time of 2 minutes in a cylinder in the injection molding (YI1) and a color tone of an injection molded piece prepared under the conditions of a cylinder temperature of 285° C. in the injection molding and a residence time of 2 minutes in a cylinder in the injection molding (YI3) is defined as a yellowing index 2 (ΔYI). In this case, the yellowing index 2 (ΔYI) is preferably not more than +0.25, more preferably not more than +0.23, still more preferably not more than +0.20.

[Yellowing Index 3 (ΔYI) in Injection Molding]

A difference between a color tone of an injection molded piece prepared using the polyester resin composition of the present embodiment under the conditions of a cylinder temperature of 285° C. in the injection molding and a residence time of 2 minutes in a cylinder in the injection molding (YI3) and a color tone of an injection molded piece prepared under the conditions of a cylinder temperature of 285° C. in the injection molding and a residence time of 5 minutes in a cylinder in the injection molding (YI4) is defined as a yellowing index 3 (ΔYI). In this case, the yellowing index 3 (ΔYI) is preferably not more than +0.25, more preferably not more than +0.23, still more preferably not more than +0.20.

In the measurement of the yellowing indexes 1 to 3, the color tone (YI) itself of the injection molded piece can be measured in an atmosphere at 23° C. and a relative humidity of 50% after an injection molded product having a thickness of 3.2 mm is subjected to moisture conditioning for 48 hours, in accordance with JIS-K-7105. Each of the yellowing indexes can be measured using a color difference/haze measuring instrument manufactured by Nippon Denshoku Industries Co., Ltd.

[Size of Ultramarine Aggregate]

A size of an ultramarine aggregate contained in the polyester resin composition of the present embodiment can be calculated in the following manner. Dried polyester resin composition pellets are subjected to extrusion molding in a single screw extruder under the prescribed film preparation conditions, thereby obtaining a film of 100 μm. In the resulting film, a 10-cm square is scanned by a stereoscopic microscope to observe ultramarine aggregates. The largest width of the ultramarine aggregates observed is measured and defined as a size of an ultramarine aggregate.

The size of the ultramarine aggregate measured as above is preferably not more than 100 μm, more preferably not more than 20 μm.

[Use Application]

The polyester resin composition of the present embodiment can be used in various applications. For example, it can be used for injection molded products, extrusion molded products such as sheet, film and pipe, bottles, foams, pressure-sensitive adhesives, adhesives, and coating materials. To describe in more detail, the sheet may be either single-layered or multilayered. The film may also be either single-layered or multilayered, and may be either unstretched or monoaxially or biaxially stretched. The film may be laminated on a steel plate or the like. The bottle may be either a direct-blown bottle or an injection blown bottle, or may be an injection molded one. The foam may be either a bead foam or an extruded foam.

EXAMPLES

The present invention will be described below in more detail with reference to examples, but it should be construed that the scope of the present invention is in no way limited to these examples.

Production of Polyester Resin

Example 1

In a 30 L polyester resin production apparatus equipped with a partial condenser, a total condenser, a cold trap, a stirrer with a torque detector, a heating device and a nitrogen feed pipe, 10999 g of dimethyl terephthalate, 5977 g of ethylene glycol, 5242 g of spiro glycol and 0.9638 g of titanium tetrabutoxide were placed, and while raising the temperature up to 225° C., transesterification reaction was carried out by a conventional method. After the amount of methanol distilled reached 90% (3267 g) of the theoretical amount of methanol to be formed by the transesterification reaction, to the reaction solution were added 1.4813 g of germanium dioxide, 5.1586 g of triethyl phosphate and ultramarine (trade name "Nubix G-58", manufactured by Nubiola). Thereafter, while maintaining the reaction solution at 225° C., the pressure was reduced down to 13.3 kPa over a period of 1 hour, and then, the temperature raising up to 270° C. and the pressure reduction down to 130 Pa were carried out over a period of 1 hour to perform polycondensation reaction. Then, the stirring speed was gradually decreased from 100 rpm, and when the stirring speed and the torque of the stirrer became 10 rpm and 200 N·m, respectively, the reaction was completed, thereby obtaining about 12 kg of a polyester resin as pellets. The ultramarine was used in an amount such that the amount of the ultramarine was 25 ppm based on the total amount of the polyester resin composition obtained. The volume median diameter d50 of the ultramarine was 1.13 μm and the 90% cumulative volume particle diameter thereof was 10.33 μm, as measured using MASTERSIZERS manufactured by Malvern Instruments Ltd.

The proportion of diol structural unit derived from a diol having a cyclic acetal skeleton in the polyester resin was 30 mol %. 20 mg of the polyester resin was dissolved in 1 g of deuterated chloroform and subjected to $^1$H-NMR measurement, and the proportion of the diol structural unit derived from a diol having a cyclic acetal skeleton was calculated from the resulting peak area ratio. The measurement was carried out at 400 MHz using JNM-AL400 manufactured by JEOL Ltd. as a measuring instrument.

Example 2

A polyester resin composition was obtained as pellets by the same operations as in Example 1, except that the ultramarine was used in an amount of 10 ppm based on the total amount of the polyester resin composition.

Example 3

A polyester resin composition was obtained as pellets by the same operations as in Example 1, except that the ultramarine was used in an amount of 2 ppm based on the total amount of the polyester resin composition.

Example 4

In a 30 L polyester resin production apparatus equipped with a partial condenser, a total condenser, a cold trap, a stirrer with a torque detector, a heating device and a nitrogen feed pipe, 13460 g of dimethyl terephthalate, 8174 g of ethylene glycol, 2138 g of Spiro glycol and 1.1795 g of titanium tetrabutoxide were placed, and while raising the temperature up to 225° C., transesterification reaction was carried out by a conventional method. After the amount of methanol distilled reached 90% (3997 g) of the theoretical amount of methanol to be formed by the transesterification reaction, to the reaction solution were added 1.8127 g of germanium dioxide, 6.3128 g of triethyl phosphate and ultramarine (trade name "Nubiflow", manufactured by Nubiola). Thereafter, while maintaining the reaction solution at 225° C., the pressure was reduced down to 13.3 kPa over a period of 1 hour, and then, the temperature raising up to 270° C. and the pressure reduction down to 130 Pa were carried out over a period of 1 hour to perform polycondensation reaction. Then, the stirring speed was gradually decreased from 100 rpm, and when the stirring speed and the torque of the stirrer became 10 rpm and 200 N·m, respectively, the reaction was completed, thereby obtaining about 12 kg of a polyester resin as pellets. The ultramarine was used in an amount such that the amount of the ultramarine was 7 ppm based on the total amount of the polyester resin composition obtained. The volume median diameter d50 of the ultramarine was 1.12 μm and the 90% cumulative volume particle diameter thereof was 2.18 μm, as measured using MASTERSIZERS manufactured by Malvern Instruments Ltd.

The proportion of diol structural unit derived from a diol having a cyclic acetal skeleton was calculated by the same operations as in Example 1. The proportion of the diol structural unit derived from a diol having a cyclic acetal skeleton in this polyester resin was 10 mol %.

Example 5

In a 30 L polyester resin production apparatus equipped with a partial condenser, a total condenser, a cold trap, a stirrer with a torque detector, a heating device and a nitrogen feed pipe, 12105 g of dimethyl terephthalate, 6965 g of ethylene glycol, 3846 g of spiro glycol and 1.0608 g of titanium tetrabutoxide were placed, and while raising the temperature up to 225° C., transesterification reaction was carried out by a conventional method. After the amount of methanol distilled reached 90% (3595 g) of the theoretical amount of methanol to be formed by the transesterification reaction, to the reaction solution were added 1.6303 g of germanium dioxide, 5.6776 g of triethyl phosphate and ultramarine (trade name "Nubiflow", manufactured by Nubiola). Thereafter, while maintaining the reaction solution at 225° C., the pressure was reduced down to 13.3 kPa over a period of 1 hour, and then, the temperature raising up to 270° C. and the pressure reduction down to 130 Pa were carried out over a period of 1 hour to perform polycondensation reaction. Then, the stirring speed was gradually decreased from 100 rpm, and when the stirring speed and the torque of the stirrer became 10 rpm and 200 N·m, respectively, the reaction was completed, thereby obtaining about 12 kg of a polyester resin as pellets. The ultramarine was used in an amount such that the amount of the ultramarine was 7 ppm based on the total amount of the polyester resin composition obtained. The volume median diameter d50 of the ultramarine was 1.12 μm and the 90% cumulative volume particle diameter thereof was 2.18 μm, as measured using MASTERSIZERS manufactured by Malvern Instruments Ltd.

The proportion of diol structural unit derived from a diol having a cyclic acetal skeleton was calculated by the same operations as in Example 1. The proportion of the diol structural unit derived from a diol having a cyclic acetal skeleton in this polyester resin was 20 mol %.

Example 6

A polyester resin composition was obtained as pellets by the same operations as in Example 1, except that "Nubiflow" (trade name, manufactured by Nubiola) was used as ultramarine, and that the ultramarine was used in an amount of 7 ppm based on the total amount of the polyester resin composition. The volume median diameter d50 of the ultramarine was 1.12 μm and the 90% cumulative volume particle diameter thereof was 2.18 μm, as measured using MASTERSIZERS manufactured by Malvern Instruments Ltd.

Example 7

In a 30 L polyester resin production apparatus equipped with a partial condenser, a total condenser, a cold trap, a stirrer with a torque detector, a heating device and a nitrogen feed pipe, 9673 g of dimethyl terephthalate, 4792 g of ethylene glycol, 6915 g of spiro glycol and 0.8476 g of titanium tetrabutoxide were placed, and while raising the temperature up to 225° C., transesterification reaction was carried out by a conventional method. After the amount of methanol distilled reached 90% (2872 g) of the theoretical amount of methanol to be formed by the transesterification reaction, to the reaction solution were added 1.3027 g of germanium dioxide, 4.5365 g of triethyl phosphate and ultramarine (trade name "Nubiflow", manufactured by Nubiola). Thereafter, while maintaining the reaction solution at 225° C., the pressure was reduced down to 13.3 kPa over a period of 1 hour, and then, the temperature raising up to 270° C. and the pressure reduction down to 130 Pa were carried out over a period of 1 hour to perform polycondensation reaction. Then, the stirring speed was gradually decreased from 100 rpm, and when the stirring speed and the torque of the stirrer became 10 rpm and 200 N·m, respectively, the reaction was completed, thereby obtaining about 12 kg of a polyester resin as pellets. The ultramarine was used in an amount such that the amount of the ultramarine was 10 ppm based on the total amount of the polyester resin composition obtained. The volume median diameter d50 of the ultramarine was 1.12 μm and the 90% cumulative volume particle diameter thereof was 2.18 μm, as measured using MASTERSIZERS manufactured by Malvern Instruments Ltd.

The proportion of diol structural unit derived from a diol having a cyclic acetal skeleton was calculated by the same operations as in Example 1. The proportion of the diol structural unit derived from a diol having a cyclic acetal skeleton in this polyester resin was 45 mol %.

Comparative Example 1

A polyester resin composition was obtained as pellets by the same operations as in Example 1, except that instead of the ultramarine, cobalt acetate was used in an amount of 10 ppm, in terms of a cobalt element, based on the total amount of the polyester resin composition.

Comparative Example 2

A polyester resin composition was obtained as pellets by the same operations as in Example 1, except that instead of the ultramarine, Phthalocyanine Blue (Pigment Blue 15:3) was used in an amount of 2.5 ppm based on the total amount of the polyester resin composition.

Comparative Example 3

A polyester resin composition was obtained as pellets by the same operations as in Example 1, except that instead of the ultramarine, Phthalocyanine Blue (Pigment Blue 15) was used in an amount of 2.5 ppm based on the total amount of the polyester resin composition.

Comparative Example 4

A polyester resin composition was obtained as pellets by the same operations as in Example 1, except that ultramarine was not used.

Reference Example 1

In Reference Example 1, "UNIPET (BK2180)" manufactured by Mitsubishi Chemical Corporation, which was a polyethylene terephthalate resin not including a diol having a cyclic acetal skeleton and containing a cobalt compound in an amount of 14 ppm, in terms of a cobalt element, based on the total amount of the polyester resin composition, was used as it was as the polyester resin.

[Color Tone Evaluation for Pellets (a Value, b Value, YI)]

Color tones (a value, b value, YI) of the pellets of the polyester resin compositions obtained in Examples 1 to 7, Comparative Examples 1 to 4, and Reference Example 1 were measured in accordance with JIS-Z-8722. The measuring instrument used was a color difference meter (model: ZE2000) manufactured by Nippon Denshoku Industries Co., Ltd. The evaluation results obtained are shown in Table 1.

[Evaluation of Gelation Ratio]

Gelation ratios of the pellets of the polyester resin compositions obtained in Examples 1, 2, 5 and 7, and Comparative Examples 1 and 4 were calculated in the following manner. Pellets of a dried polyester resin composition were placed in a SUS container, and the container was purged with nitrogen and then hermetically closed. Thereafter, the pellets of the polyester resin composition in the SUS container were heated at 270° C. or 290° C. for a predetermined time and then dissolved in chloroform, followed by suction filtration to obtain insolubles. The insolubles obtained on the filter were dried to a constant weight, and a weight ratio thereof to the initial amount of the pellets (weight of pellets of the polyester resin composition given when the pellets were enclosed in the SUS container) was calculated as a gelation ratio. The heating time at 290° C. was set to 18 hours, 24 hours and 30 hours, and a gelation ratio for each heating time was measured. The heating time at 270° C. was set to 42 hours and 60 hours, and a gelation ratio for each heating time was measured.

[Evaluation of Color Tone (YI) of Injection Molded Piece]

For the measurement of a color tone of an injection molded piece, the polyester resin compositions obtained in Examples 1 to 7 and Comparative Example 1 were each subjected to injection molding. For the injection molding, an injection molding machine (model: SE130DU) manufactured by Sumitomo Heavy Industries, Ltd. was used. An injection molded piece having a thickness of 3.2 mm was prepared under the conditions of a screw rotational speed of 80 rpm, cylinder temperature of 265° C. in the injection molding and a residence time of 2 minutes in a cylinder in the injection molding. A color tone (YI1) of the resulting injection molded piece was measured in an atmosphere at 23° C. and a relative humidity of 50% after moisture conditioning of the injection molded product for 48 hours, in accordance with JIS-K-7105. The measuring instrument used was a color difference/haze measuring instrument (model: COH-400) manufactured by Nippon Denshoku Industries Co., Ltd.

Moreover, using each of the polyester resin compositions obtained in Examples 1 to 7 and Comparative Example 1, an injection molded piece was prepared similarly to the above under the conditions of a cylinder temperature of 265° C. in the injection molding and a residence time of 5 minutes in a cylinder in the injection molding, and a color tone (YI2) of the resulting injection molded piece was measured. Furthermore, using each of the polyester resin compositions obtained in Examples 1 to 7, Comparative Example 1 and Reference Example 1, an injection molded piece was prepared under the conditions of a cylinder temperature of 285° C. in the injection molding and a residence time of 2 minutes in a cylinder in the injection molding, and a color tone (YI3) of the resulting injection molded piece was measured. Still furthermore, using each of the polyester resin compositions obtained in Examples 2 to 6 and Reference Example 1, an injection molded piece was prepared under the conditions of a cylinder temperature of 285° C. in the injection molding and a residence time of 5 minutes in a cylinder in the injection molding, and a color tone (YI4) of the resulting injection molded piece was measured. The evaluation results obtained are shown in Table 1. With regard to Comparative Examples 2 to 4, the color tone of the pellets was undesirable, and therefore, evaluation using an injection molded piece was not carried out.

[Evaluation of Yellowing Index 1 (ΔYI) in Injection Molding]

In Examples 1 to 7 and Comparative Example 1, a difference between the color tone (YI1) and the color tone (YI2) was calculated to determine a yellowing index 1 (ΔYI). The evaluation results obtained are shown in Table 1.

[Evaluation of Yellowing Index 2 (ΔYI) in Injection Molding]

In Examples 1 to 7 and Comparative Example 1, a difference between the color tone (YI1) and the color tone (YI3) was calculated to determine a yellowing index 2 (ΔYI). The evaluation results obtained are shown in Table 1.

[Evaluation of Yellowing Index 3 (ΔYI) in Injection Molding]

In Examples 2 to 6 and Reference Example 1, a difference between the color tone (YI3) and the color tone (YI4) was calculated to determine a yellowing index 3 (ΔYI). The evaluation results obtained are shown in Table 1.

[Size of Ultramarine Aggregate]

The polyester resin composition pellets obtained as above were subjected to extrusion molding through a T-die method using a twin-screw extruder (manufactured by Research Laboratory of Plastics Technology Co., Ltd., trade name: BTN-30-S2-30-A type extruder, screw diameter: 29.75 mmφ, L/D: 30) under the preparation conditions of a cylinder temperature of 245 to 265° C., a T-die temperature of 240 to 260° C., a screw rotational speed of 80 rpm and a chill roll temperature of 60 to 110° C., thereby obtaining a film of 100 μm. In the resulting film, a 10-cm square was scanned by a stereoscopic microscope to observe ultramarine aggregates. The largest width of the ultramarine aggregates observed was measured and defined as a size of an ultramarine aggregate.

TABLE 1

|  |  | Example | | | | | | | Comparative Example | | | | Reference Example |
|---|---|---|---|---|---|---|---|---|---|---|---|---|---|
|  |  | 1 | 2 | 3 | 4 | 5 | 6 | 7 | 1 | 2 | 3 | 4 | 1 |
| Diol structural unit having cyclic acetal skeleton | Spiro glycol [mol %] | 30 | 30 | 30 | 10 | 20 | 30 | 45 | 30 | 30 | 30 | 30 | 0 |
| Blue coloring material added | Ultramarine [ppm] | 25 | 10 | 2 | 7 | 7 | 7 | 10 | — | — | — | — | — |
|  | Cobalt acetate [ppm] (concentration: in terms of cobalt element) | — | — | — | — | — | — | — | 10 | — | — | — | — |
|  | Cobalt compound [ppm] (concentration: in terms of cobalt element) | — | — | — | — | — | — | — | — | — | — | — | 14 |
|  | Phthalocyanine Blue 15:3 [ppm] | — | — | — | — | — | — | — | — | 2.5 | — | — | — |
|  | Phthalocyanine Blue 15 [ppm] | — | — | — | — | — | — | — | — | — | 2.5 | — | — |
| Ultramarine, volume median diameter d50 [μm] |  | 1.13 | 1.13 | 1.13 | 1.12 | 1.12 | 1.12 | 1.12 | — | — | — | — | — |
| Ultramarine, 90% cumulative volume particle diameter [μm] |  | 10.33 | 10.33 | 10.33 | 2.18 | 2.18 | 2.18 | 2.18 |  |  |  |  |  |
| Evaluation results for resin pellets | Yellowing YI | −12.3 | −2.2 | 6.9 | 1.8 | 1.2 | 0.1 | −5.5 | −2.6 | −18.8 | −16.6 | 12.7 | −1.3 |
|  | a value | −1.2 | −1.2 | −0.8 | −1.1 | −1.3 | −1.3 | −0.7 | −0.2 | −9.8 | −9.6 | −0.9 | −1.2 |
|  | b value | −3.3 | −0.3 | 2.4 | 0.9 | 0.8 | 0.5 | −1.5 | −0.7 | −1.6 | −1.1 | 4.2 | −0.3 |
|  | Gelation ratio (290° C., 18 h) [%] | 0.3 | 0.1 | — | — | 0.3 | — | 0.2 | 1.4 | — | — | 3.5 | — |
|  | Gelation ratio (290° C., 24 h) [%] | 0.3 | 2.9 | — | — | 3.7 | — | 4.1 | 50.8 | — | — | 14.3 | — |
|  | Gelation ratio (290° C., 30 h) [%] | 0.8 | 55.4 | — | — | 53.7 | — | 41.4 | 69.3 | — | — | 68.5 | — |
|  | Gelation ratio (270° C., 42 h) [%] | 1.5 | 1.4 | — | — | 1.6 | — | 1.1 | 4.6 | — | — | 4.7 | — |
|  | Gelation ratio (270° C., 60 h) [%] | 2.7 | 2.1 | — | — | 1.7 | — | 1.8 | 72.4 | — | — | 41.3 | — |
| Evaluation results for injection molded piece | Color tone (YI1) (265° C., 2 min) | −0.77 | 1.34 | 2.15 | 2.03 | 1.86 | 1.6 | 0.72 | 0.54 | — | — | — | — |
|  | Color tone (YI2) (265° C., 5 min) | −0.66 | 1.41 | 2.23 | 2.06 | 1.99 | 1.72 | 0.77 | 0.84 | — | — | — | — |
|  | Color tone (YI3) (285° C., 2 min) | −0.73 | 1.35 | 2.27 | 2.13 | 1.97 | 1.61 | 0.75 | 1.09 | — | — | — | 1.47 |
|  | Color tone (YI4) (285° C., 5 min) | — | 1.48 | 2.40 | 2.34 | 2.20 | 1.79 | — | — | — | — | — | 1.63 |
|  | Yellowing index 1 (ΔYI) \|YI1−YI2\| | 0.11 | 0.07 | 0.08 | 0.03 | 0.13 | 0.12 | 0.05 | 0.30 | — | — | — | — |
|  | Yellowing index 2 (ΔYI) \|YI1−YI3\| | 0.05 | 0.01 | 0.12 | 0.10 | 0.11 | 0.01 | 0.03 | 0.55 | — | — | — | — |
|  | Yellowing index 3 (ΔYI) \|YI3−YI4\| | — | 0.13 | 0.13 | 0.21 | 0.23 | 0.18 | — | — | — | — | — | 0.16 |
| Size of ultramarine aggregate [μm] |  | — | 89 | — | — | — | 13 | — | — | — | — | — | — |

As shown in Table 1, it can be seen that the polyester resins (Examples 1 to 7), which were within the scope of the present invention, that is, which contained ultramarine and included structural unit derived from a diol having a cyclic acetal skeleton, had no problem in the color tone evaluation for the resin pellets, and that the yellowing index (ΔYI) thereof was small and thus favorable even though molding was carried out at a high temperature in the injection molding or even though molding was carried out after a long residence time, as shown in Examples 1 to 7. In addition, it can be seen that the gelation ratio of the polyester resin (Example 1), which was within the scope of the present invention, that is, which contained ultramarine and included structural unit derived from a diol having a cyclic acetal skeleton, was small and thus favorable even though the resin was exposed to a high temperature for a long period of time.

On the other hand, as shown in Table 1, it can be seen that the polyester resin (Comparative Example 1), which deviated from the scope of the present invention, that is, which contained not ultramarine but a cobalt compound and included structural unit derived from a diol having a cyclic acetal skeleton, had no problem in the color tone evaluation for the resin pellets, but that when molding was carried out at a high temperature in the injection molding or when molding was carried out after a long residence time, the yellowing index (ΔYI) was large and thus unfavorable. In addition, it can be seen that when the polyester resin was exposed to a high temperature for a long period of time, the gelation ratio was large and thus unfavorable.

As shown in Table 1, it can be seen that the polyester resins (Comparative Examples 2 and 3), which deviated from the scope of the present invention, that is, which contained not ultramarine or a cobalt compound but a blue coloring material other than ultramarine and included structural unit derived from a diol having a cyclic acetal skeleton, had a small a value in the color tone evaluation for the resin pellets, and was thus problematic.

As shown in Table 1, it can be seen that the polyester resin (Comparative Example 4), which deviated from the scope of the present invention, that is, which did not contain any blue coloring material and included structural unit derived from a diol having a cyclic acetal skeleton, had a large b value and large YI in the color tone evaluation for the resin pellets, and was thus problematic. In addition, it can be seen that when the polyester resin was exposed to a high temperature for a long period of time, the gelation ratio was large and thus unfavorable.

As shown in Table 1, it can be seen that the polyester resin (Reference Example 1), which deviated from the scope of the present invention, that is, which contained a cobalt compound and did not include a cyclic acetal skeleton in the diol structural unit, had no problem in the color tone evaluation for the resin pellets, and that even though molding was carried out after a long residence time in the injection molding, the yellowing index (ΔYI) was small and thus favorable. That is to say, as can be seen from the results of Reference Example 1, it is a problem specific to the polyester resin comprising structural unit derived from a diol having a cyclic acetal skeleton that when carrying out molding at a high temperature or carrying out molding after a long residence time at a high temperature, the resulting product suffers yellowing depending upon the type of the coloring material added, and this problem can be solved by the present invention.

INDUSTRIAL APPLICABILITY

The polyester resin composition of the present invention has industrial applicability as a material in various fields such as fields of injection molded products, extrusion molded products, foams, pressure-sensitive adhesives, adhesives and coating materials.

The invention claimed is:

1. A polyester resin composition comprising a polyester resin and 2 to 25 ppm of an ultramarine based on a total amount of the polyester resin composition, wherein
   a volume median diameter d50 of the ultramarine is 0.1 to 20 μm,
   the polyester resin comprises a dicarboxylic acid structural unit and a diol structural unit,
   the diol structural unit comprise a structural unit derived from a diol having a cyclic acetal skeleton, and
   a content of the structural unit derived from a diol having a cyclic acetal skeleton is 10 to 45 mol % based on a total amount of the diol structural unit; wherein
   gel is present in the polyester resin composition at a gelation ratio of 10% or less wherein gelation ratio is determine after heating to a temperature of 270° C. for a time of 60 hours followed by dissolution in chloroform, and
   the diol having a cyclic acetal skeleton is a diol represented by the following formula (1) and/or formula (2):

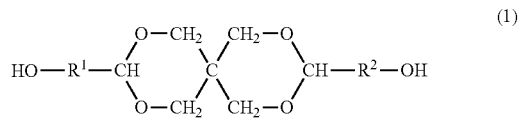

wherein $R^1$ and $R^2$ each independently represent an organic group selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms,

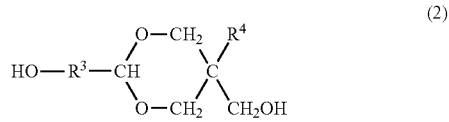

wherein $R^3$ and $R^4$ each independently represent an organic group selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms, and
   wherein pellets formed from the polyester resin composition have color tone a value from +8.0 to −8.0; color tone b value from +4.0 to −10.0; and color tone color tone YI (Yellowing) from +12.0 to −30.0; all as measured in accordance with JIS-Z-8722.

2. The polyester resin composition according to claim 1, wherein the diol having a cyclic acetal skeleton is 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

* * * * *

UNITED STATES PATENT AND TRADEMARK OFFICE
CERTIFICATE OF CORRECTION

| | |
|---|---|
| PATENT NO. | : 10,844,215 B2 |
| APPLICATION NO. | : 16/099063 |
| DATED | : November 24, 2020 |
| INVENTOR(S) | : T. Morishita et al. |

It is certified that error appears in the above-identified patent and that said Letters Patent is hereby corrected as shown below:

In the Claims

Column 18, Lines 44, 45 (Claim 1) change "color tone color tone" to -- color tone --

Signed and Sealed this
Sixth Day of April, 2021

Drew Hirshfeld
*Performing the Functions and Duties of the
Under Secretary of Commerce for Intellectual Property and
Director of the United States Patent and Trademark Office*